United States Patent [19]

Maeng

[11] Patent Number: 5,062,015
[45] Date of Patent: Oct. 29, 1991

[54] DAT CASSETTE LOADING DEVICE

[75] Inventor: Hyun J. Maeng, Anyang, Rep. of Korea

[73] Assignee: Goldstar Alps Electronics Co., Ltd., Kyongsangnam, Rep. of Korea

[21] Appl. No.: 455,178

[22] Filed: Dec. 22, 1989

[30] Foreign Application Priority Data

Dec. 30, 1988 [KR] Rep. of Korea .................. 88-18025

[51] Int. Cl.$^5$ ................... G11B 5/008; G11B 15/675
[52] U.S. Cl. ..................................... 360/96.5; 360/83
[58] Field of Search .................... 360/96.5, 83, 85

[56] References Cited

U.S. PATENT DOCUMENTS

| | | | |
|---|---|---|---|
| 4,680,654 | 7/1987 | Shibuya | 360/96.5 |
| 4,752,844 | 6/1988 | Suzuki | 360/85 |
| 4,799,117 | 1/1989 | Ohyama | 360/96.5 |
| 4,868,693 | 9/1989 | Tsutsumi et al. | 360/85 |
| 4,933,789 | 6/1990 | Ikeda | 360/86.5 |

Primary Examiner—A. J. Heinz
Assistant Examiner—Jefferson Evans
Attorney, Agent, or Firm—Birch, Stewart, Kolasch & Birch

[57] ABSTRACT

A digital audio tape cassette loading device includes an up-down holder assembled to an adjusting plate operatively associated with the brackets by a shaft, a first pin caulked into a cam lever inserted through an oblong hole of an opening lever, a second pin caulked into the cam lever inserted into a cam groove of a cam gear which has a horizontal movement region, a vertical movement region, and a marginal stroke region for adjusting in mode to match with a rack of a tray side plate for engagement.

9 Claims, 4 Drawing Sheets

DAT CASSETTE LOADING DEVICE

BACKGROUND OF THE INVENTION

1. Field of the Invention

The present invention relates to a digital audio tape (hereinafter "DAT") cassette loading device and more particularly to, a tray type cassette loading device for a DAT.

2. Description of the Prior Art

According to the conventional art, various types of tray-type cassette loading devices for a DAT receive a cassette onto a cassette holder and horizontally moves the tray by the audio of a cam gear mounted on an axle which is fitted on a rack and brackets to move the cassette holder and the up-down plate connecting to the former along with the cassette tray. The cassette slider of such cassette loading devices opens while the cassette tray is horizontally moved. The cam gear rotation makes to rotate the cam lever pivotally associated with the cam gear and up-down holder and to rotate the up-down plate. Therefore, the cassette holder and the cassette set in the holder are vertically moved.

SUMMARY OF THE INVENTION

Accordingly, it is an object of the present invention to provide an improved tray type cassette loading device for a DAT.

Another object of the present invention is to provide a DAT cassette loading device which is light weight, compact, attractive, economical to manufacture, durable in use, and refined in appearance.

A further object of the present invention is to provide an improved DAT cassette loading device which includes a cassette holder, an up-down plate, a tray, a pair of side brackets, a cam gear, an up-down holder, a cam lever, an adjusting plate, a tension spring, and a cam groove, whereby the cassette loading device is light weight, compact, attractive, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a digital audio tape cassette loading device comprising a cassette holder, an up-down plate pivotably connected to the cassette holder by a shaft, a tray operatively associated with the cassette holder and the up-down plate, a pair of side brackets fixed in parallel to each other about a main base for supporting the cassette holder, the up-down plate, and the tray, a cam gear attached to the brackets by an axle pin, the cam gear having a cam groove, a full wheel gear for engaging with an electric motor, and an intermittent gear for engaging with a rack of the tray, an up-down holder fitted on an axle shaft mounted through the rear ends of the side brackets for operatively moving the up-down plate, a cam lever mounted to the axle shaft, the cam lever having a pin disposed at the font end thereof wherein the pin is inserted into the cam groove for pivotably moving the up-down holder, an adjusting plate having a projection fixed to the cam lever by pins which are respectively inserted into oblong holes in a way of exposing an insert hole in the cam lever through a square opening for making the projection to contact a bend of the up-down holder, a tension spring connected between the up-down holder and spring holders, a cam groove of the cam gear having a first region for horizontal movement of the cassette, a second region for vertical movement of the cassette, and a third region for applying marginal stroke to the cassette wherein the marginal stroke is in proportion to the tension strength of the tension spring by pivotably moving the cam lever to produce a gap between the projection of the cam lever and a bend of the up-down holder after setting the cassette on support posts disposed on the main base, and a fourth region for preventing the cam gear from a reverse rotation by the force of restitution of the tension spring.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
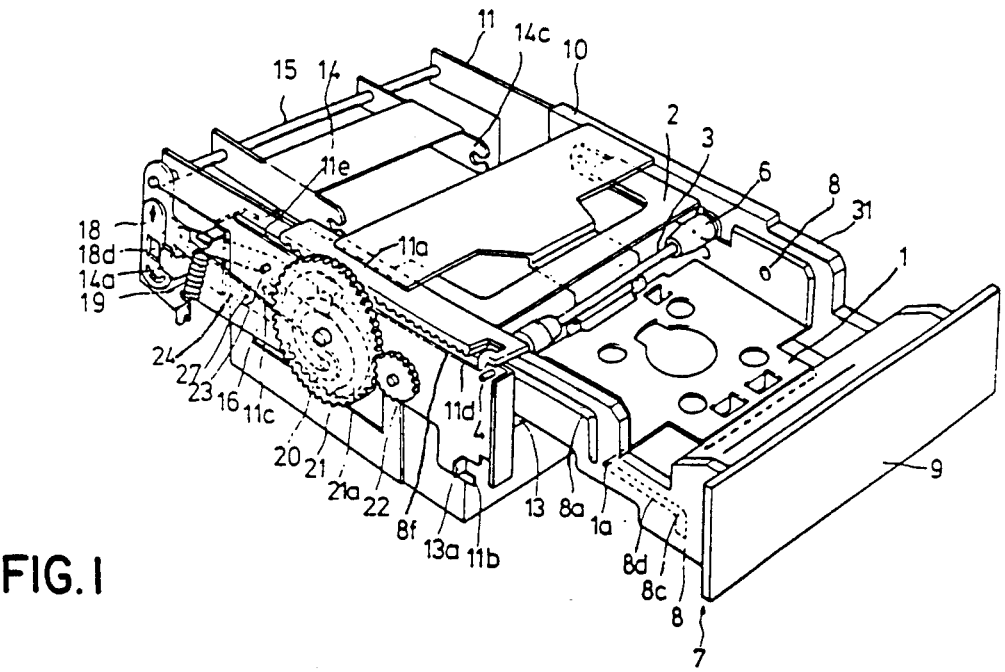
FIG. 1 is a perspective view of a DAT cassette loading device according to the present invention.
Figure 2:
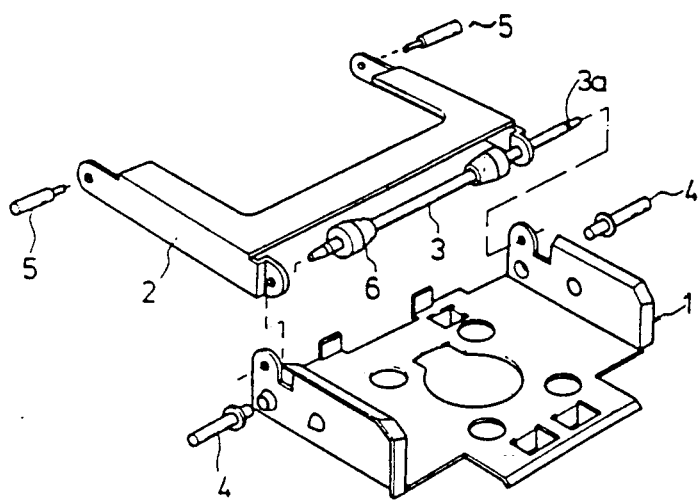
FIG. 2 is an exploded perspective view of a cassette holder and an up-down plate according to the present invention.
Figure 3:
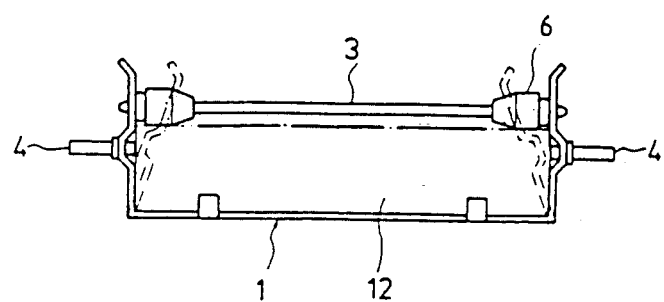
FIG. 3 is a top plan view of the cassette holder according to the present invention.

Referring now in detail to the drawings for the purpose of illustrating preferred embodiments of the present invention, the DAT cassette loading device as shown in FIGS. 1, 2, and 3 comprises a cassette holder 1, an up-down plate 2 connected to the holder 1 by a shaft 3, a pair of pins 4 and 5 inserted into both ends of the holder 1 and the plate 2, respectively, the shaft 3 having rubber members 6 inserted onto both end portions thereof. A tray 7 is connected to the holder 1 and the plate 2 for associated movement with respect to each other and includes side panels 8, a door 9, and a supporter 10.

Left and right side brackets 11 supporting the tray 7 for its movements are erected with a distance to each other on a main base 13. An up-down holder 14 of a rear part of the brackets 11 linked to a shaft 15 for pivoting the up-down plate 2 to vertically move the holder 1 and one end of the holder 14 is linked to a cam lever 16. The cam lever has a fixed pin 17 used for opening the cover and a fixed plate 18 for adjusting the position of the cam lever 16 which is combined resiliently with the holder 14 by means of a tension spring 19.

The left bracket 11 is mounted on respective axles and a cam gear 21 and a motor driven gear 22 are engaged with each other. The cam gear 21 is provided with a pin disposed in a cam groove 21a wherein the pin 20 is fixed at the end of the cam lever 16. Also, a bush 23 fixed to the left bracket 11 receives a pin 25 for pivotally attaching a lever 24 for opening the cassette cover. The pin 17 is inserted into oblong hole 24a disposed at the rear end of the lever 24 (FIG. 12).

Figure 5:
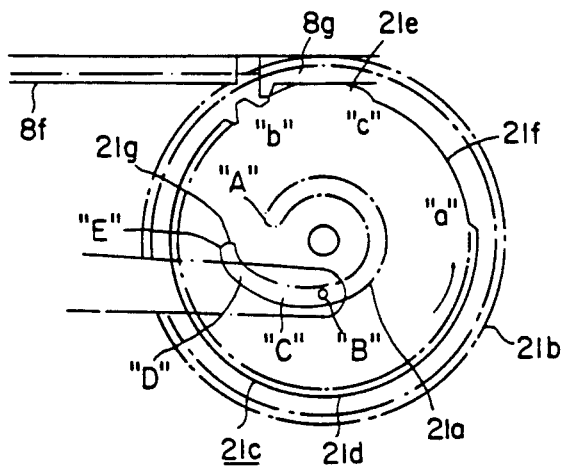
FIGS. 5 and 6 are side elevational views of the cam gear according to the present invention showing the construction and operation thereof.
Figure 6:
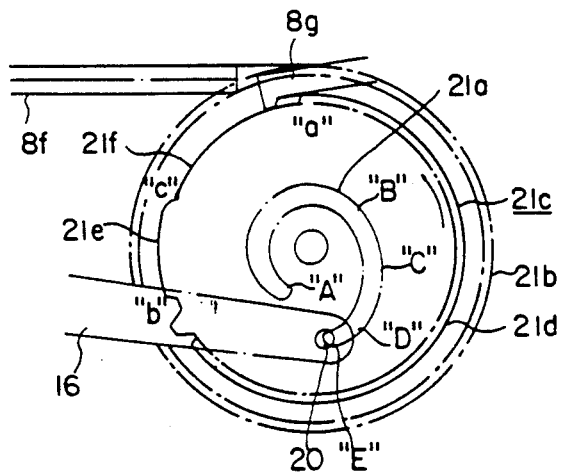

The cam gear 21 is provided with a full geared wheel 21b arranged for engaging the motor gear 22 and an intermittently geared wheel 21c arranged for engaging the rack 8f which is formed in the tray side plate 8. The intermittent gear wheel 21c has a gear section 21d for engaging with the rack 8f so as to move the distance of a section (a)-(b) and also has a non-geared section, which has a projective section 21e for blocking reverse movement at a section (b)-(c) and a recessed section 21f for a section (c)-(a) for reducing the elastic strain of the resilient gear 8g. That is a stopper spring formed at the end of the rack 8f (FIGS. 5 and 6).

Figure 8:
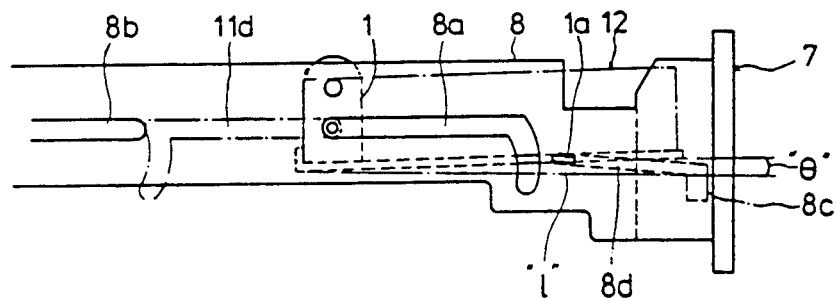
FIG. 8 is a side elevational view of the cassette holder in ejection state according to the present invention.

Whereas, the tray side plates 8 and the side brackets 11 are respectively provided with guideways 8a, 8b and 11d, 11e through pins 4 and 5 wherein the guideways 8a and 11d has an arcuated vertical section, respectively (FIG. 8).

The cam groove 21a of the cam gear 21 is divided into regions (A)-(B), (B)-(C), (C)-(D), and (D)-(E). The (A)-(B) region is concentric with the cam gear 21 and provides the horizontal movement of the cassette 12. The (B)-(C) region provides the up-down movement of the cassette 12 with variation of the arc, the (C)-(D) region representing the stroke for applying a pressure to the cassette 12, and the (D)-(E) region prevents the cam gear 21 from reversing rotation by the action of the spring 19. But in the guide groove, the point (E) is further away from the wheel center than the point (C) and nearer to the center than the point (D) (FIGS. 5 and 6).

In manufacturing the tray 7, the cassette holder 1 receives pins 4 in caulking into both sides thereof and the up-down plate 2 receives pins 5s in caulking into sides thereof. The holder 1 and the plate 2 are joined into an assembly by the shaft 3, which is inserted with two rubber members 6s each at its end parts (FIG. 2) and is provided with steps 3a, s to keep a distance from the cassette 12 and maintain the walls of the holder 1 at right angle to the bottom floor (FIG. 3).

The pins 4 and 5 are inserted into the guideways 8a and 8b formed in the left side plate 8 of the tray 7 with the door 9 which is fastened to the left side plate 8 of the tray 7. The right side plate 8 is assembled in the same manner as above to attach the tray supporter 10 to the top sides of the side plates 8 and make the construction of the tray 7 solid (FIG. 1).

The assembled tray 7 receives the guide pin 1a disposed at the front part of the cassette holder 1 into the slant portion 8d of the guideway 8c which is formed at the front inner side of the left side plate 8 so that the cassette holder 1 in ejected state as shown in FIG. 1 declines at an angle θ to the basic line 1 to allow the easy in-and-out placing of the cassette 12 to the holder 1 (FIG. 8).

In manufacturing the bracket 11, the left side bracket 11 is caulked with pins and a bush 23 and fitted in with a motor gear 22 and cam gear 21 and after inserting through a bush 23, a pin 25 caulked to an opening lever 24 is fastened with a stop washer. The right side bracket 11 is also caulked with pins so that the left and right brackets 11 receive axle pins 26' of guide rolls 26 two each for the bracket 11. The brackets 11 are provided with a fixed pin 11a for attaching an end sensor and with a hook groove 11b. The assembled left and right brackets 11 are inserted to a main base 13 in such a manner that the hook groove 11b stops the projective hook 13a in hooking for a clamp screw 27 to fasten the fastening plate 11c. The brackets 11 are then erected straight to keep uprightness.

In manufacturing an up-down holder 14, it is fitted in a way of not interfering a bend 14a with a cam lever 16 which is caulked with pins 17 and 20 to have a spring 19 secured to each end at spring holders 14b and 16a and an adjuster plate opening 18d exposing an disposed in the middle portion thereof for exposing an adjuster insert hole 16b of the cam lever 16 is arranged to adjust the stroke for applying pressure to the cassette and is fastened to the cam lever 16 by screws which are received in oblong holes 18a and 18b provided separately at the upper and lower sides of the plate 18. The projection 18c is arranged to resiliently contact with a bend 14a of the up-down holder 14, the shaft is fitted with an E ring 28 to block a rightward movement of the holder 14.

Figure 4:
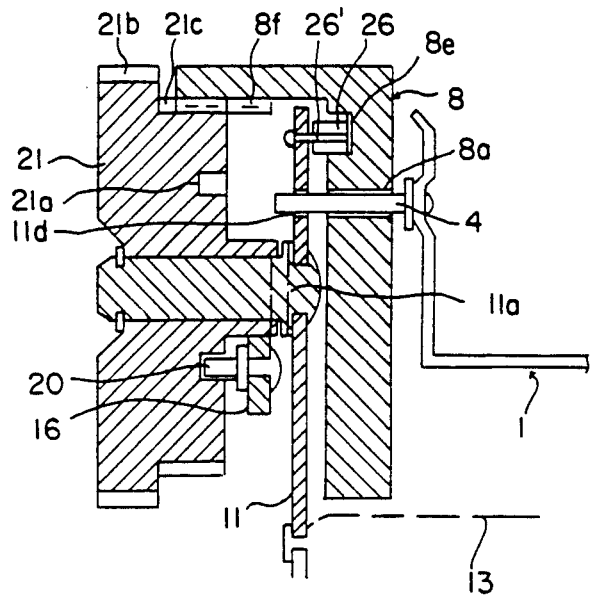
FIG. 4 is a sectional view of a cam gear according to the present invention showing the construction thereof.

With the brackets 11 erected on the main base 13, the tray 7 is assembled with the brackets 11 in a way of inserting guide rolls 26 with axles thereof which are provided on the inner side of the brackets 11s into the guideway 83 (FIG. 4). The pins 4s and 5s put through guideways 8a and 8b of the tray 7 being inserted into guideways 11d and 11e of the brackets 11s.

The up-down holder 14 are associated with the brackets 11 by means of the shaft 15, and the pin 17 caulked into the cam lever 16 is inserted through an oblong hole 24a of the opening lever 24 (FIG. 12). The pin 20 caulked into the cam lever 16 is inserted into a cam groove 21a of a cam gear 21 which is adjusted in mode to match with the rack 8f of the tray side plate 8 for engagement.

Figure 7:
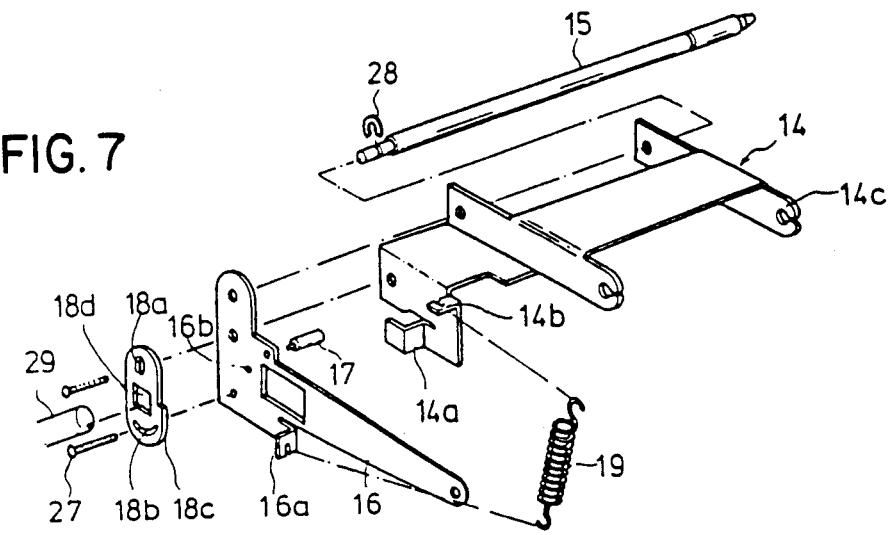
FIG. 7 is an exploded perspective view of the up-down holder and cam lever according to the present invention.

With the cam lever 16 at this stage loosely attached to the holder 14 by a screw, the height of the bracket 14c of the holder 14 and the relative height of the cam lever 16 on the cam curve are adjusted by an eccentric jig 29 for fine adjustment (FIG. 7) in reference to the height of the pin 4 and the loose screw 27 is tightened to make the adjuster plate 18 integral with the cam lever 16 in combination and thus push the up-down holder 14. A top cover (not shown) is set in place to stand alone by the front loader.

A plurality of support legs 1b are provided under the holder 1 therefor with the cassette 12 in place to keep on the main base 13 but not to contact the cassette 12 (FIG. 12). Cassette support posts 30 are provided under the main base 13 (FIG. 12). Embossed projections 31 are provided to outwardly protrude from both the side plates for smooth movement of the cassette holder.

Figure 9:
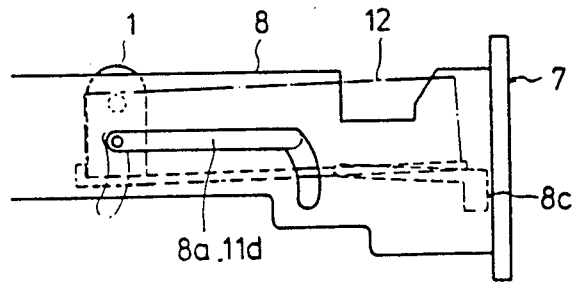
FIG. 9 is a side elevational view of the cassette holder in horizontally moving state.

According to the present invention, the DAT cassette loading device operates as follows:

FIGS. 1 and 8, the cassette holder 1 is positioned to decline following the slanted portion 8d of the guideway 8c in the left side plate 8 of the tray 7 to allow an easy insertion of a cassette 12. With the cassette 12 set onto the cassette holder 1, the motor gear 22 drives the cam gear 21 engaged through the wheel gear thereof with the gear 22 to rotate the intermittent gear 21c as shown in section a to b of FIG. 5 so that the geared section of the gear 21c engages with the rack 8f of the tray 7. Thus, the tray 7 slides with the cassette holder 1 and the up-down plate 2 to pass through the state of FIG. 9 and horizontally move the distance equal to the sum of the horizontal sections of both the tray guideway 8a and the bracket guideway 11d. Therefore, the holder 1 with the cassette 12 reaches the position for the caulked pin 4 to move downward (FIGS. 10, 11(A) and 12(A)).

In the above operation, the assembly unit of the tray 7 makes a smooth horizontal movement with the rolling of the guide rolls 26 fitted into the tray side plates 8s. At the position for switching from the horizontal movement to the vertical movement of the cassette holder 1, the rack 8f of the tray 7 momentarily comes off the intermittent gear section 21c of the cam gear 21 so as to cut off the driving power and presents a risk of reverse movement, that is the opening direction of the tray 7 with the cassette holder for the possible break-off of the tray to change the operation mode. However, the section (b)-(c) in the intermittent gear wheel is provided against such a reverse movement of the tray assembly unit.

Besides, at the resilient gear 8g and a stopper provided on the rack section 8f of the tray 7 (FIG. 6), the rotation of the cam gear in association with the rack 8f of the tray 7 moves the tray 7 to an exact position and the section (c)-(a) in the intermittent gear is made to be lower than the section (c)-(b) so that the cam gear 21 and the resilient gear 8g remain long with out elastic strain in the section of non-engagement between them when the cassette holder is reached in good condition.

Figure 10:
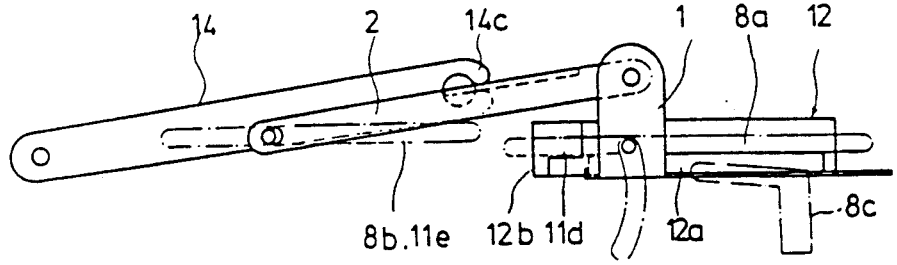
FIG. 10 is a side elevational view of the cassette holder at the end of horizontal movement according to the present invention.
Figure 11A:
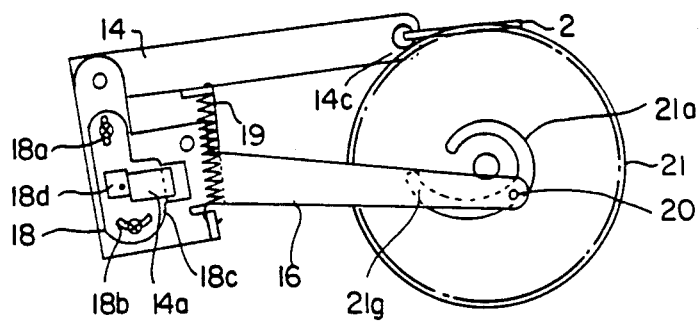
FIGS. 11(A) and 11(B) illustrate the operation of the cam gear and the cam lever in loading operation of the cassette holder according to the present invention.

Furthermore, while in horizontal movement, the cam lever 16 stays with the cam gear 21 for the up-down holder 14 to keep a height of viewing the up-down plate 2. Thus when the tray 7 reaches the end of its horizontal movement, the up-down plate 2 engages into the bracket 14c of the holder 14 as shown in FIG. 10.

With the cam gear 21 still in rotation, the horizontal movement of the tray 7 is arranged to switch into a vertical movement. While the tray 7 stands still after the horizontal movement, only the cassette holder 1 makes the vertical movement so that the cam gear 21 is provided with non-geared sections 21e and 21f of the intermittent gear 21c so as to cut off the driving power transferred through the rack 8c of the tray 7. Therefore, the cam lever 16 which is followed by the concentric curve in the region (A)-(B) as shown in FIG. 6 of the cam groove during the rotational movement of the non-geared section in the section (b)-(a) as shown in FIG. 5 switches to a downward movement.

The up-down holder 14 moving in association with the lever 16 engages the up-down plate 2 to make a vertical movement (FIGS. 11 and 12). However, the cassette holder 1 needs to make a vertical movement only to the depth of the vertical section of the guideway 11d provided in the bracket 11.

In order to give a pushing force to the up-down holder 1 pressing the up-down plate 2, an allowance is provided in the cam curve for the marginal stroke of the lever 16. The allowance is provided to give some gap between the holder 1 and the cassette 12, and prevent the holder 1 from obstructing the safe set-in of the cassette 12 placed on the support posts 30 on the main base 13.

That is, about the time for the cam gear 21 in continuous rotation to start a vertical movement, the cam lever 16 moves downward following the cam groove 21a so that the up-down holder 14 engages the up-down plate 2 to move downward and set the cassette holder into the right place. The vertical stroke (toward downward) of the cam curve is made to be larger than the vertical stroke in the cassette holder 1 to give an extra pushing force to the holder 1 for its safe placement. The cam lever 16 is made to move down further relative to the up-down holder 14 but the extra marginal stroke is absorbed in the spring 19.

Figure 11B:
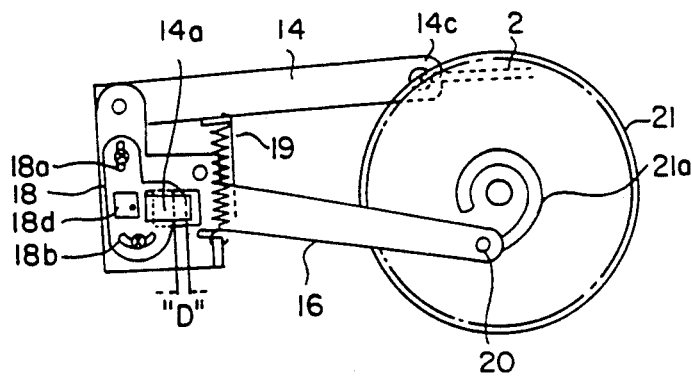

The spring 19 applies a pulling force between the up-down holder 14 and the cam lever 16 so that the cassette holder 1 sets securely on the support posts 30s with a strong pressure (FIGS. 11 and 12). After being guided to the point of applying the last pressure in the cam curve, the pin 20 of the cam lever 16 is arranged to follow the concentric circular curve and is in the state of power cut-off so that the strong pulling force of the spring 19 tends to cause a reverse rotation of the cam gear 21. However, the end portion 21g of the cam groove 21a is a little bent inwardly in the region (D)-(E) as shown in FIGS. 5 and 6 to smoothly hold the pin 20 as shown in FIG. 11(B).

With the set-in of the cassette holder, the cassette 12 moved downward out the support posts 30 but the cassette holder 1 moves further down to be restrained by the guideway 11d of the brackets 11. The extra force applied to the cassette 12 is absorbed by the elasticity of rubber members 6 (FIG. 12). The cassette 12 placed on the cassette holder 1 is loaded to be securely set onto the support posts 30 on the main base 13 for completion of the loading.

In loading with the opening of the slider 12a of the cassette 12, the cover 12b opens. The opening operation of the slider 12a proceeds first with the movement of the holder 1 from the position shown in FIG. 8 to that shown in FIG. 9 to stop the horizontal movement of the holder. This process is accomplished by the movement of the cassette 12 and the tray 7 under a stroke.

Figure 12A:
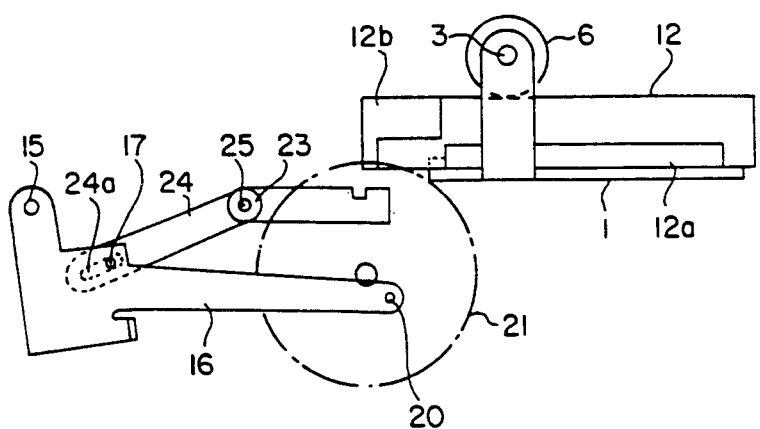
FIGS. 12(A) and 12(B) are side elevational views of a cover in open state and the cassette in b set-in state according to the present invention.
Figure 12B:
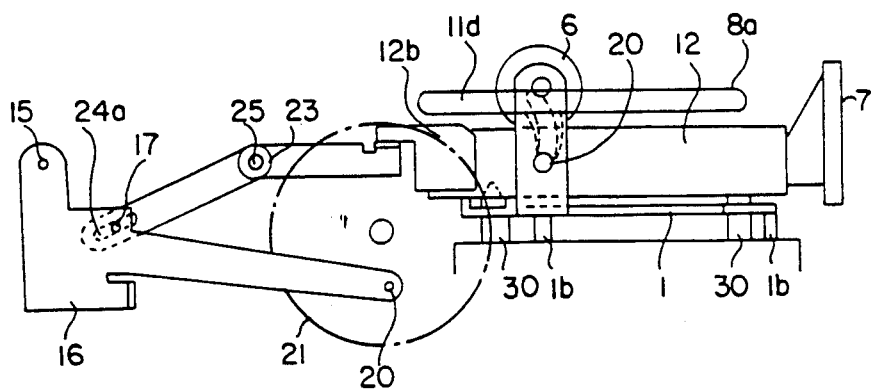

Also, the opening operation of the cover 12b of the cassette 12 is made with the vertical movement of the cassette 12 as shown in FIG. 12 when the cam lever 16 starts to move down in rotation in association with the cam gear 21, the pin 17 caulked into the lever 16 begins to raise the opening lever 24 from the state shown in FIG. 12(A) to that shown in FIG. 12(B) until the lever 16 reaches the lowest state along the cam curve. Thereafter, the opening lever 24 completely reverses the direction of rotation to open the cover 12b of the cassette. When the cover 12b opens, the reel in the cassette 12 is released from the locked state to unwind the tape.

The ejecting operation is performed in the reverse process of the above loading operation. But, at the final stage of ejection, the supporter 10 pushed out the cassette 12 to a distance to make easy the removing of the cassette 12.

As described above, the present invention relates to a tray type system among DAT cassette housing mechanisms, which brings the effect of making the whole device light, thin, and simple to facilitate in an assembly and inexpensive to manufacture.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A digital audio tape cassette loading device comprising:
   a cassette holder,
   an up-down plate pivotably connected to said cassette holder by a shaft,
   a tray connected to said cassette holder and said up-down plate for associated movement with respect to each other,
   a pair of side brackets fixed in parallel to each other about a main base for supporting said cassette holder, said up-down plate, and said tray,
   a cam gear attached to said brackets by an axle pin, said cam gear having a cam groove, a full wheel gear for engaging with an electric motor, and an intermittent gear for engaging with a rack of said tray,
   an up-down holder fitted on an axle shaft mounted through rear end portions of said side brackets for operatively moving the up-down plate,
   a cam lever mounted to said axle shaft, said cam lever having a pin disposed at the front end thereof wherein the pin is inserted into said cam groove for pivotably moving the up-down holder,
   an adjusting plate having a projection fixed to said cam lever by pins which are respectively inserted into oblong holes for exposing an insert hole in said cam lever through a square opening for contacting to a bend of the up-down holder,
   a tension spring connected between said up-down holder and spring holders, and
   said cam groove of said cam gear having a first region for horizontal movement of the cassette, a second region for vertical movement of the cassette, and a third region for applying marginal stroke to the cassette wherein the marginal stroke is in proportion to the tension strength of said tension spring by pivotably moving the cam lever to produce a gap between the projection of the cam lever and a bend of the up-down holder after setting the cassette on support posts disposed on the main base, and a fourth region for preventing the cam gear from a reverse rotation by the force of restitution of the tension spring.

2. The digital audio tape cassette loading device of claim 1, wherein the intermittent gear is provided with a first section for preventing the tray from reverse movement of the tray by pressing a resilient gear such as a stopper disposed on a front end portion of the rack of the tray so as to engage with a non-geared section formed on said intermittent gear of the cam gear and with a section further recessed relative to a projective section for preventing elastic strain of the resilient gear.

3. The digital audio tape cassette loading device of claim 1, wherein a front inner side of a left side plate of the tray is provided with a first guideway having a slanted portion to receive a guide pin when ejecting the cassette holder to make the cassette holder slantly disposed at an angel to the horizontal base line for easy insertion of the cassette and a pair of second guideways disposed on the left side plate of the tray and a pair of third guideways disposed on both brackets are arranged so as to have an arc shaped vertical guideway in a completing position of the horizontal movement of the tray, respectively.

4. The digital audio tape cassette loading device of claim 1, wherein a bush fixed to a rear inner side of the bracket receives an axle pin caulked into a middle of a cover opening lever with an oblong hole in rear end portion of the lever which is arranged to receive a pin fixed to the cam lever.

5. The digital audio tape cassette loading device of claim 1, wherein a shaft operatively associated with the cassette holder with the up-down plate is supported on side walls of the cassette holder and provided with steps formed perpendicular to a bottom face of the cassette holder.

6. The digital audio tape cassette loading device of claim 1, wherein side plate of the tray are provided with an fourth guideway disposed at the upper side to receive guide rolls fixed by an axle pin to an upper inner side of the respective bracket.

7. The digital audio tape cassette loading device of claim 1, wherein the cassette holder is provided with embossed projections on the respective outer sides of side walls of the cassette holder, said cassette holder has a plurality of support legs under the bottom of the cassette holder for preventing the cassette from contacting with the cassette holder by keeping the balance of the cassette holder disposed on the main base on setting of the cassette holder.

8. The digital audio tape cassette loading device of claim 1, wherein the side brackets are provided with a fixed pin to attach an end sensor.

9. The digital audio tape cassette loading device of claim 1, wherein the main base is provided with projective hooks disposed at front portion thereof so as to fit into hook grooves of the brackets and is removably joined with the brackets by screw-fastening clamp pins disposed at rear portions of the brackets for easy assembling and separation.

* * * * *